(12) United States Patent
Wilk et al.

(10) Patent No.: US 11,738,509 B2
(45) Date of Patent: Aug. 29, 2023

(54) EXTRUDERS AND PRINTING MACHINES FOR 3D METAL PRINTING

(71) Applicants: Krzysztof Wilk, Mysłowice (PL); Filip Turzyński, Sopot (PL); Bartosz Janus, Piekary Śląskie (PL); Robert Olesz, Piasek (PL); Piotr Jop, Pawłów (PL)

(72) Inventors: Krzysztof Wilk, Mysłowice (PL); Filip Turzyński, Sopot (PL); Bartosz Janus, Piekary Śląskie (PL); Robert Olesz, Piasek (PL); Piotr Jop, Pawłów (PL)

( * ) Notice: Subject to any disclaimer, the term of this patent is extended or adjusted under 35 U.S.C. 154(b) by 330 days.

(21) Appl. No.: 16/944,256

(22) Filed: Jul. 31, 2020

(65) Prior Publication Data
US 2022/0001608 A1    Jan. 6, 2022

(51) Int. Cl.
| | |
|---|---|
| *B29C 64/209* | (2017.01) |
| *B29C 64/118* | (2017.01) |
| *B29C 64/295* | (2017.01) |
| *B29C 64/241* | (2017.01) |
| *B33Y 30/00* | (2015.01) |

(52) U.S. Cl.
CPC .......... *B29C 64/209* (2017.08); *B29C 64/118* (2017.08); *B29C 64/241* (2017.08); *B29C 64/295* (2017.08); *B33Y 30/00* (2014.12)

(58) Field of Classification Search
CPC ........ B22F 10/18; B22F 12/53; B29C 64/118; B29C 64/209
See application file for complete search history.

(56) References Cited

U.S. PATENT DOCUMENTS

| | | | | |
|---|---|---|---|---|
| 3,576,051 | A * | 4/1971 | Click | B29C 48/03 425/327 |
| 6,085,957 | A * | 7/2000 | Zinniel | B65H 51/30 226/43 |
| 2001/0030383 | A1* | 10/2001 | Swanson | B33Y 70/00 242/570 |
| 2007/0003656 | A1* | 1/2007 | LaBossiere | B29C 48/05 425/375 |
| 2015/0147427 | A1* | 5/2015 | Lundwall | B29C 48/2888 425/375 |
| 2016/0236409 | A1* | 8/2016 | Armani | B29C 64/106 |

FOREIGN PATENT DOCUMENTS

CN      209633783 U  * 11/2019

* cited by examiner

*Primary Examiner* — Joseph S Del Sole
*Assistant Examiner* — Ariella Machness

(57) ABSTRACT

Extruders for 3D printing machines are disclosed, which are configured to print with fragile metallic filament substrates. The extruders include two rotating elements, each of which is at least partially cylindrical, with the two rotating elements being positioned parallel to each other (with a first of the rotating elements being configured to rotate in a first direction and a second of the rotating elements being configured to rotate in a second opposite direction). The extruders are operably connected to a transmission, which is configured to drive rotation of the rotating elements in the first direction and the second opposite direction. The extruders further include a metallic filament contact zone located in a cylindrical area of each of the two rotating elements, along with a flexible coating that at least partially covers the metallic filament contact zone. The flexible coating is configured to be removed and replaced by an operator of the 3D printing machine.

1 Claim, 5 Drawing Sheets

EXTRUDERS AND PRINTING MACHINES FOR 3D METAL PRINTING

CROSS-REFERENCE TO RELATED APPLICATIONS

This application claims priority to E.U. patent application number EP20184112, filed on Jul. 6, 2020.

FIELD OF THE INVENTION

The field of present invention relates to devices and methods for three-dimensional printing and, more particularly, for three-dimensional printing with metallic printing materials and substrates.

BACKGROUND OF THE INVENTION

A three-dimensional (3D) printing process using metallic substrates is currently performed in two primary ways, which generally include a direct and indirect method of 3D printing. The direct printing method utilizes a metal powder substrate, which produces a finished target product. The indirect printing method produces a semi-finished target product that represents a composite of metal powder and a polymer mix, with the resulting product requiring further processing in order to achieve a finalized product (such further processing involves the removal of polymer through a de-binding process and further sintering).

3D printing machines include an assembly that is configured deliver printing materials (substrates) to the print head. In some cases, such assemblies are known to include two drive-transfer gears, which together provide constant and uniform feeding of the printing material to the print head. Such 3D printers may further include motion transfer assemblies and digital position sensors, which facilitate accurate deposition of printing material and desirable operation of such printers. Notably, however, currently-available 3D printers are not configured to utilize a printing material (substrate) that consists of metal in the form of a filament (or that otherwise includes a high level of metal in a filament). Such currently-available 3D printers are not configured to handle metallic filaments, due to the fragility of such material, low feed rates, uneven material flows, and high risk of print failures.

In view of the foregoing, there is a continuing need for improved 3D printers that are configured to effectively utilize printing materials (substrates) that consist of metallic filaments. As the following will demonstrate, the devices and methods of the present invention address such needs in the marketplace.

SUMMARY OF THE INVENTION

According to certain aspects of the present invention, 3D printing extruders (and 3D printing machines that include such extruders) are provided, which are particularly adapted for printing with metallic filaments. The 3D printing machines are configured to produce semi-finished target objects through layered material deposition techniques. As used herein, and described further below, the printing materials (also known as substrates) used with the extruders and 3D printing machines described herein will consist of a fragile filament containing up to about 85% metal.

According to such aspects of the present invention, the extruders generally include two rotating elements, preferably in the form of gears that make contact with the metal filament and are configured to advance the filament towards the print head of the 3D printing machine. Importantly, the invention provides that the two rotating elements are covered with a flexible coating, which is configured to generate a suitable amount of friction with the metallic filament (to enable such rotating elements to grip and advance the metallic filament forward towards the print head). The invention provides that such rotating elements are preferably configured to be installed within existing 3D printers without the use of specialized tools (and can be carried out by 3D printing operators with existing 3D printing machines, without assistance from the original 3D printing machine manufacturer), i.e., the invention provides that existing 3D printing machines can be retrofitted with the rotating elements described herein.

In the extruders of the present invention, the rotating elements are, preferably, at least partially cylindrical and arranged to be parallel with each other, such that each of the rotating elements are configured to rotate along the axis of the cylindrical part, with the first of the two rotating elements being configured to rotate in an opposite direction to the other/second rotating element. The invention provides that each of the rotating elements is operably connected to a knurled drive transmission (at least at one end thereof)—and includes a material feed zone in the cylindrical area of the rotating element. In addition, the invention provides that such material feed zone of at least one (and optionally both) of the rotating elements will preferably exhibit a reduced diameter area, thereby creating space between the surface of the material feed zone and the exchangeable flexible coating material located on the exterior surface of the rotating element(s).

The material feed zones of both rotating elements are at least partly covered with the resilient and flexible coating mentioned above. The invention provides that the resilient and flexible coating material is preferably replaceable—and will preferably exhibit a hardness between 20D and 70D on the Schore scale to provide the required friction mentioned above (to generate adequate friction force and to ensure desirable feed efficiency for the metal printing materials). Non-limiting examples of such resilient and flexible coating materials include polyurethane, elastomers, vulcanized rubber, rubber, polyvinyl chloride, and ethylene copolymer. The rotating elements are preferably manufactured from metal, such as steel, hardened steel, titanium, brass, bronze and polymers, and/or other suitably rigid and resilient materials.

According to additional aspects of the invention, 3D printers are provided that include the extruders described herein, along with methods of printing target objects using printing materials in the form of metal filaments.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 1:
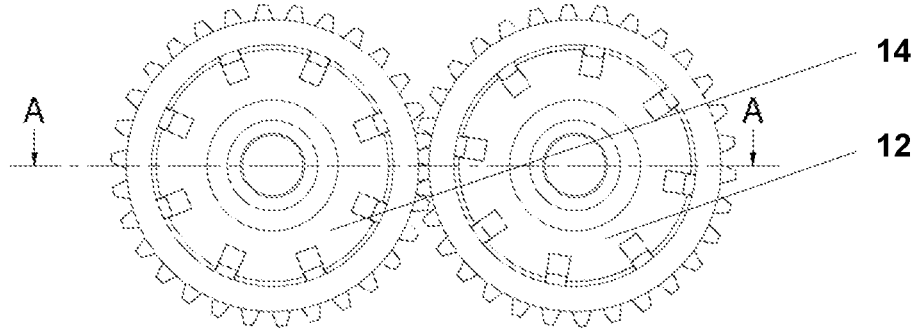
FIG. 1: a front view of the rotating elements described herein, which are responsible for feeding the printing material to the print head.
Figure 2:
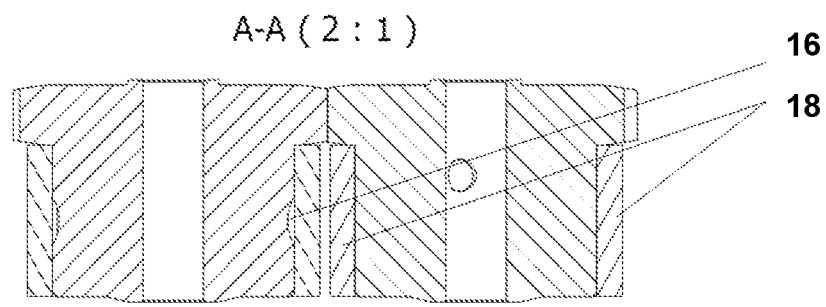
FIG. 2: a cross-sectional top view of the rotating elements that are shown in FIG. 1.
Figure 3:
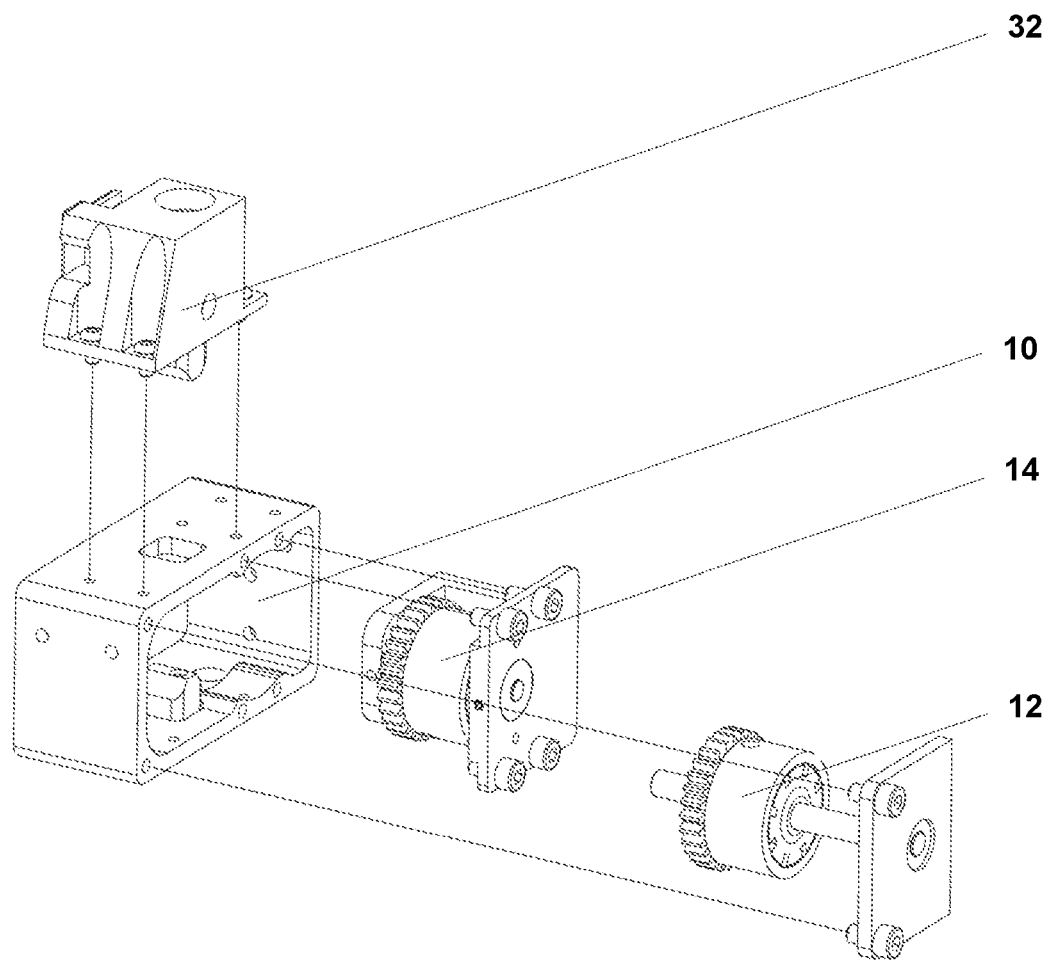
FIG. 3: an oblique view of the printing material feeding system described herein.
Figure 4:
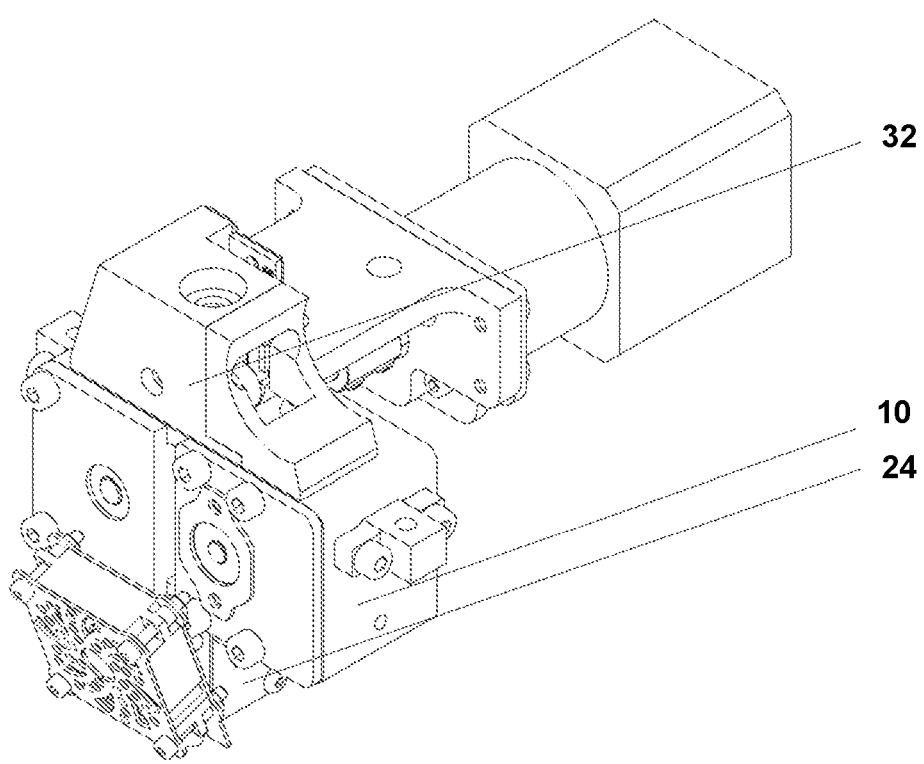
FIG. 4: an oblique view of the 3D printing assemblies described herein.
Figure 5:
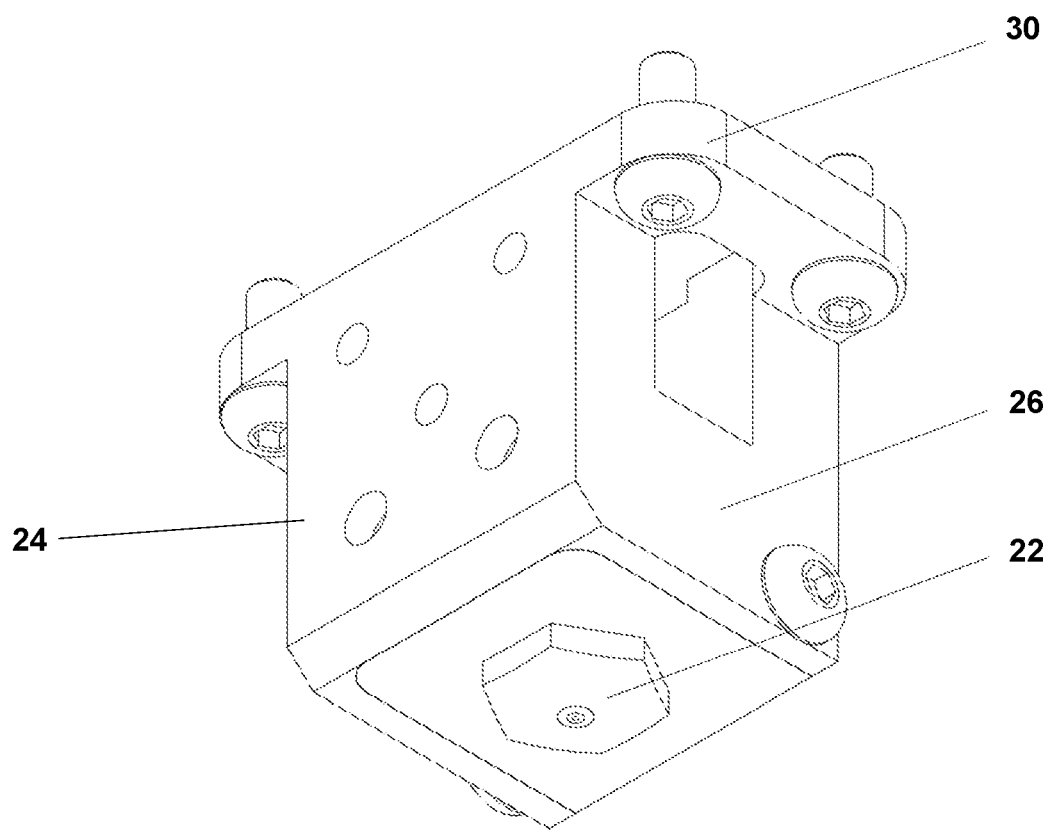
FIG. 5: an oblique view of the print head described herein.
Figure 6:
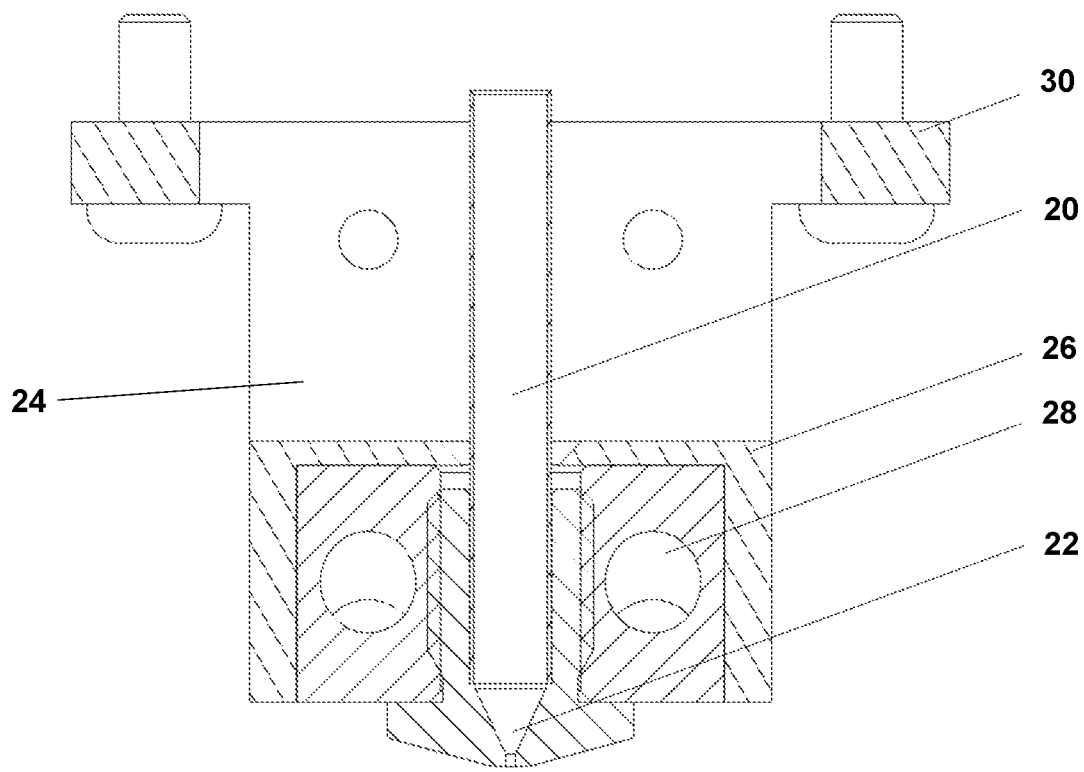
FIG. 6: a cross-sectional view of the print head shown in FIG. 5.

Referring now to FIGS. 1-6, the present invention relates to extruders for 3D printing machines, which are configured to print with fragile/metallic filament substrates. More specifically, the extruders of the present invention are particularly configured to advance and print with metallic filament substrates that contain between 50% and 85% metal. The extruders and 3D printing machines of the present invention enable 3D printing from such fragile/metallic filaments, which have very low mechanical strength and marginal bending resistance. The invention provides that the extruders and 3D printing machines are configured to undertake a typical printing process at a speed of extrusion that preferably ranges from 30 mm/s to 80 mm/s.

The extruders of the present invention include an extruder body 10—and two rotating elements 12/14, each of which is at least partially cylindrical (and may optionally be entirely cylindrical). The invention provides that the two rotating elements 12/14 are positioned parallel to each other, with a first of the rotating elements 12 being configured to rotate in a first direction and a second of the rotating elements 14 being configured to rotate in a second opposite direction. In certain preferred embodiments, the invention provides that the two rotating elements 12/14 may consist of two cooperating knurled gears. The invention provides that the extruders further include a transmission that is operably connected to at least one end of each of the two rotating elements 12/14, with the transmission being configured to drive rotation of the rotating elements 12/14 in the first direction and the second opposite direction. The invention provides that the two rotating elements 12/14 may be operably connected to separate transmissions—or, in other embodiments, the rotating elements 12/14 may be configured to share and to be operably connected to a single transmission.

According to certain preferred embodiments of the present invention, the rotating elements 12/14 include a metallic filament contact zone 16 located in a cylindrical area of each of the two rotating elements 12/14. The invention provides that a flexible coating 18 at least partially covers the metallic filament contact zone 16, with the flexible coating 18 being configured to be removed and replaced by an operator of the 3D printing machine (such flexible coating 18 may be affixed to the metallic filament contact zone 16 through adhesives, mechanical attachments, or other attachment means). According to certain preferred embodiments, the invention provides that the metallic filament contact zone 16 of at least one of the rotating elements 12/14 exhibits a reduced diameter area, with the reduced diameter area being dimensioned to create space between an exterior surface of the metallic filament contact zone 16 and the flexible coating 18. The invention provides that the rotating elements 12/14 will preferably comprise a rigid material, such as plastic, metal, and metal alloys (e.g., steel, hardened steel, titanium, brass, and/or bronze).

The invention provides that the flexible coating 18 preferably exhibits a hardness between 20D and 70D, as measured on a Schore scale. The flexible coating 18 will preferably comprise a flexible material, such as polyurethane, elastomers, vulcanized rubber, rubber, polyvinyl chloride, ethylene copolymer, or combinations of the foregoing materials. The use and presence of the flexible coating 18 produces a desirable amount of friction, which enables fast and increased printing material feeds, avoids damage to the fragile printing material, and helps to maintain a consistently high quality printing result. In addition, since the flexible coating 18 is configured to be replaceable, such feature will allow printer operators to easily and quickly replace of worn or damaged flexible coatings 18—which significantly reduces service time.

In addition to the extruders described herein, the present invention further encompasses 3D printing machines that include and are operably connected to such extruders. More specifically, the 3D printing machines of the present invention include a print head 24 connected to the extruder body 10. The print head 24 includes a channel 20, a heating block 26, two heating elements 28, a heat shield 30, and a print nozzle 22. The invention provides that the print nozzle 22 preferably exhibits a conical shape and an opening angle of at least 150-degrees (relative to the internal channel 20 of the print head 24), which together facilitate a proper flow of printing materials and which prevent unwanted soiling and occlusion.

In such preferred embodiments, the 3D printing machines preferably include a digital position sensor module 32 operably connected to the extruder. The invention provides that the digital position sensor 32 is preferably configured to detect a potential failure in the area of the extruded printed material. The invention provides that the digital position sensor 32 is further configured to increase print material feeding accuracy.

In such preferred embodiments of the invention, the metallic printing filament is fed into the digital position sensor module 32 and then into the extruder body 10 by the rotating elements 12/14. The advancement of the metallic printing filament into the print head 24 is facilitated through contact between the metallic printing filament and the flexible coating 18 mounted on and affixed to the rotating elements 12/14 in the metallic filament contact zone 16, as described herein. The invention provides that the metallic filament is guided through the channel 20 of the print head 24, whereupon the metallic filament is heated via the heating block 26, through a system of the two heating elements 28, and directly extruded through the nozzle 22. The invention provides that the heat shield 30 is configured to prevent heat loss from the extrusion area.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. An extruder for a 3D printing machine that is adapted to print with metallic filament substrates, which comprises:
   (a) two rotating elements, each of which is at least partially cylindrical, wherein the two rotating elements are positioned parallel to each other, with a first of the rotating elements being configured to rotate in a first direction and a second of the rotating elements being configured to rotate in a second opposite direction;

(b) a transmission that is operably connected to at least one end of each of the two rotating elements, wherein the transmission is configured to drive rotation of the rotating elements in the first direction and the second opposite direction;
(c) a metallic filament contact zone located in a cylindrical area of each of the two rotating elements; and
(d) a flexible coating that at least partially covers the metallic filament contact zone, wherein the flexible coating is configured to be removed and replaced by an operator of the 3D printing machine, wherein:
  (i) the two rotating elements comprise two cooperating knurled gears, which are made of a material selected from the group consisting of plastic, metal, and metal alloys, wherein the metal alloys are selected from the group consisting of steel, hardened steel, brass, and bronze;
  (ii) the metallic filament contact zone of at least one of the rotating elements exhibits a reduced diameter area, wherein the reduced diameter area is dimensioned to create space between an exterior surface of the metallic filament contact zone and the flexible coating;
  (iii) the flexible coating (A) exhibits a hardness between 20D and 70D, as measured on a Schore scale and (B) comprises a material selected from the group consisting of polyurethane, elastomers, vulcanized rubber, rubber, polyvinyl chloride, ethylene copolymer, and combinations of the foregoing materials; and
  (iv) the extruder is (A) operably connected to a print head that includes a channel, heating block, and a conical-shaped nozzle and (B) configured to advance metallic filament substrates towards the print head, wherein the metallic filament substrates are between 50% and 85% metal.

* * * * *